United States Patent
Morino et al.

(10) Patent No.: US 8,986,164 B2
(45) Date of Patent: Mar. 24, 2015

(54) HYDRAULIC PRESSURE CONTROL DEVICE AND VEHICLE CONTROL DEVICE

(75) Inventors: Takuro Morino, Numadu (JP); Shuji Moriyama, Susono (JP); Yoshio Ito, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 14/239,026

(22) PCT Filed: Jan. 11, 2012

(86) PCT No.: PCT/JP2012/050396
§ 371 (c)(1),
(2), (4) Date: Feb. 14, 2014

(87) PCT Pub. No.: WO2013/105233
PCT Pub. Date: Jul. 18, 2013

(65) Prior Publication Data
US 2014/0315687 A1 Oct. 23, 2014

(51) Int. Cl.
F16H 61/00 (2006.01)
F16D 48/02 (2006.01)
B60W 10/02 (2006.01)
B60W 10/06 (2006.01)

(52) U.S. Cl.
CPC ............ F16D 25/14 (2013.01); F16H 61/0021 (2013.01); *B60Y 2400/72* (2013.01); *F16H 2061/0034* (2013.01); *B60W 10/02* (2013.01); *B60W 10/06* (2013.01)
USPC .......................................................... 477/151

(58) Field of Classification Search
None
See application file for complete search history.

(56) References Cited

U.S. PATENT DOCUMENTS

| | | | |
|---|---|---|---|
| 4,428,258 A * | 1/1984 | Kubo et al. | 477/151 |
| 6,059,681 A | 5/2000 | Takiguchi | |
| 6,364,802 B1 | 4/2002 | Yi | |
| 7,220,214 B2 * | 5/2007 | Iwamoto et al. | 477/98 |
| 2010/0167874 A1 | 7/2010 | Shirasaka et al. | |
| 2014/0296032 A1 * | 10/2014 | Morino et al. | 477/174 |

FOREIGN PATENT DOCUMENTS

| | | | |
|---|---|---|---|
| JP | 11-210876 A | 8/1999 | |
| JP | 2001-082592 A | 3/2001 | |
| JP | 2001-082596 A | 3/2001 | |
| JP | 2002-115755 A | 4/2002 | |
| JP | 2002-130449 A | 5/2002 | |
| JP | 2008-215592 A | 9/2008 | |
| JP | 2010-151226 A | 7/2010 | |
| WO | 2010-021218 A1 | 2/2010 | |
| WO | 2013/076825 A1 | 5/2013 | |

* cited by examiner

*Primary Examiner* — Dirk Wright
(74) *Attorney, Agent, or Firm* — Kenyon & Kenyon LLP (57) ABSTRACT

A hydraulic pressure control device includes an accumulator configured to accumulate oil supplied by a mechanical pump and discharge the accumulated oil to a control system; a first oil path connected to a hydraulic path (clutch oil path) at an upstream side than an SLC linear solenoid; a second oil path connected to the hydraulic path (clutch oil path) at a downstream side of a manual valve; a connection control unit (switching valve, accumulation control valve) configured to control the connection between the accumulator and the hydraulic path to communicate the accumulator to either one of the first oil path and the second oil path; and a back pressure control oil path configured to supply the oil supplied by the mechanical pump to the back pressure side of the accumulator.

9 Claims, 8 Drawing Sheets

HYDRAULIC PRESSURE CONTROL DEVICE AND VEHICLE CONTROL DEVICE

CROSS-REFERENCE TO RELATED APPLICATIONS

This is a national phase application based on the PCT International Patent Application No. PCT/JP2012/050396, filed on Jan. 11, 2012, the entire contents of which is incorporated herein by reference.

FIELD

The present invention relates to a hydraulic pressure control device and a vehicle control device.

BACKGROUND

A vehicle capable of executing an idling stop function, in which stopping of an engine and releasing of a clutch are performed during travelling of the vehicle, is conventionally known. In such a vehicle, the hydraulic pressure for activating a drive system of the clutch sometimes lacks if the engine is stopped during the execution of the idling stop function, and thus a configuration including an accumulator that can accumulate and discharge the hydraulic pressure to compensate for the lack of hydraulic pressure is known. For example, patent literature 1 discloses a configuration including a first accumulator for supplying the hydraulic pressure to the drive system of the clutch at the time of engine restart upon returning from the idling stop control, and a second accumulator for reducing an engagement shock of the clutch.

CITATION LIST

Patent Literature

Patent Literature 1: Japanese Patent Application Laid-open No. 2002-115755

SUMMARY

Technical Problem

In the configuration including two accumulators, for supplying the hydraulic pressure at the time of engine restart and for reducing the engagement shock, as in the configuration described in patent literature 1, the number of components increases and the configuration becomes complex.

In light of the foregoing, it is an object of the present invention to provide a hydraulic pressure control device and a vehicle control device capable of realizing both the supply of hydraulic pressure to the clutch at the time of engine restart and the reduction of the engagement shock of the clutch with a simple configuration.

Solution to Problem

In order to achieve the above mentioned object, a hydraulic pressure control device according to the present invention including: a mechanical pump configured to discharge oil by driving of an engine of a vehicle; a hydraulic path configured to supply the oil discharged by the mechanical pump to a clutch; a clutch pressure control valve arranged on the hydraulic path and configured to control a clutch pressure, which is a hydraulic pressure to be supplied to the clutch; and a selection valve arranged on a downstream of the clutch pressure control valve of the hydraulic path and configured to select the clutch to supply the oil from the hydraulic path, the hydraulic pressure control device includes: an accumulator configured to accumulate oil supplied by the mechanical pump and discharge the accumulated oil to supply to the clutch; a first oil path connected to the hydraulic path at an upstream side of the clutch pressure control valve; a second oil path connected to the hydraulic path at a downstream side of the selection valve; a connection control means configured to control a connection between the accumulator and the hydraulic path to communicate the accumulator to either one of the first oil path and the second oil path; and a third oil path configured to supply the oil supplied by the mechanical pump to a back pressure side of the accumulator.

Further, in the hydraulic pressure control device, it is preferable that the connection control means includes a switching valve configured to switch to communicate the accumulator to the hydraulic path through the first oil path at the time the engine is stopped and to communicate the accumulator to the hydraulic path through the second oil path at the time the engine is operating, and an accumulation control valve arranged between the switching valve and the accumulator to control accumulation and discharging of the accumulator.

Further, in the hydraulic pressure control device, it is preferable to further include a check valve arranged on an upstream side than a connecting position with the first oil path on the hydraulic path and configured to prevent a backflow of oil toward the upstream side of the hydraulic path.

Further, in the hydraulic pressure control device, it is preferable that the third oil path is connected to the hydraulic path at the upstream side of the check valve.

In order to achieve the above mentioned object, a vehicle control device according to the present invention includes an engine; a clutch; and a hydraulic pressure control device according to claims 1 to 4 configured to control a hydraulic pressure of oil supplied to activate the clutch, wherein the vehicle control device is capable of executing an eco-run control that stops the engine during travelling of the vehicle.

Advantageous Effects of Invention

In the hydraulic pressure control device and the vehicle control device according to the present invention, the single accumulator can be used for both the function (accumulating/discharging function) for supplying the hydraulic pressure to the clutch at the time of engine restart and the function (dumper function) for reducing the engagement shock of the clutch, and can be used properly according to purpose by connecting the accumulator to the hydraulic path through either the first oil path or the second oil path. Furthermore, the discharging capacity of the accumulator can be temporarily reduced by supplying the oil supplied by the mechanical pump through the third oil path toward the negative pressure side of the accumulator, thus reducing the performance of the accumulator to the performance necessary for the dumper function. As a result, the hydraulic pressure control device and the vehicle control device according to the present invention have the effects of being able to realize the supply of hydraulic pressure to the clutch at the time of engine restart and the reduction of the engagement shock of the clutch with a simple configuration.

DESCRIPTION OF EMBODIMENTS

An embodiment of a hydraulic pressure control device and a vehicle control device according to the present invention will be hereinafter described based on the drawings. In the following drawings, the same or corresponding portions are donated by the same reference numerals, and the description thereof will not be repeated.

Embodiment

Figure 1:
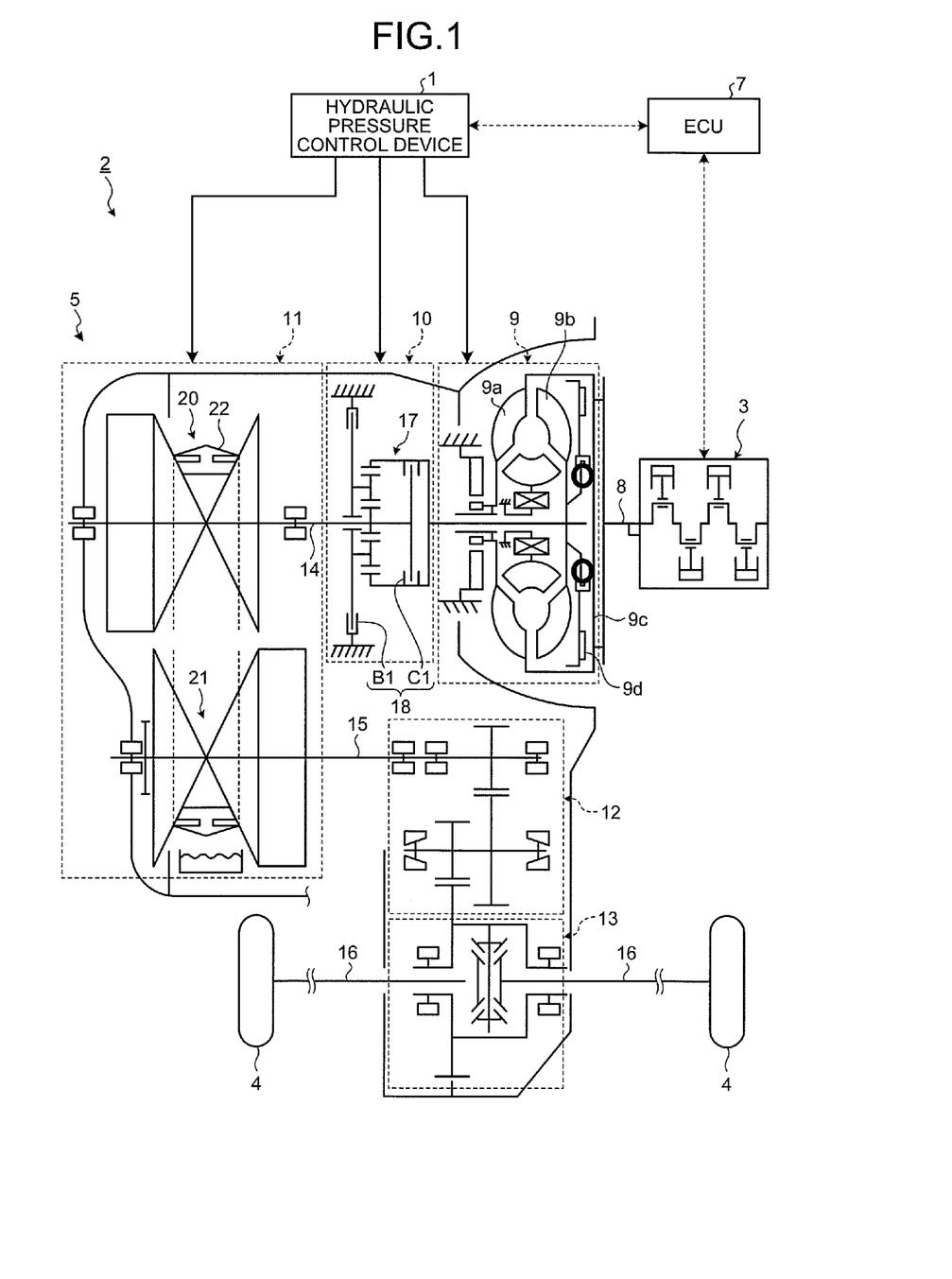
FIG. 1 is a schematic view illustrating a configuration of a vehicle mounted with a hydraulic pressure control device according to one embodiment of the present invention.

One embodiment of the present invention will be described with reference to FIGS. 1 to 8. First, a configuration of a vehicle 2 mounted with a hydraulic pressure control device 1 according to the present embodiment will be described with reference to FIG. 1. As illustrated in FIG. 1, the vehicle 2 includes an engine 3 serving as a power source at the time of travelling, a drive wheel 4, a power transmitting device 5, a hydraulic pressure control device 1, and an electronic control unit (ECU) 7.

The engine 3 is a travelling drive source (prime mover) for causing the vehicle 2 to travel, and consumes fuel to generate the power to act on the drive wheel 4 of the vehicle 2. The engine 3 causes a crankshaft 8, which is an engine output shaft, to generate a mechanical power (engine torque) with the combustion of fuel, and can output the mechanical power from the crankshaft 8 to the drive wheel 4.

The power transmitting device 5 transmits the power from the engine 3 to the drive wheel 4. The power transmitting device 5 is arranged on a transmission path of the power from the engine 3 to the drive wheel 4, and is activated by the pressure of oil (hydraulic pressure) serving as a liquid medium.

More specifically, the power transmitting device 5 is configured to include a torque converter 9, a forward-reverse switching mechanism 10, a continuously variable transmission mechanism 11, a decelerating mechanism 12, a differential gear 13, and the like. The power transmitting device 5 has the crankshaft 8 of the engine 3 and an input shaft 14 of the continuously variable transmission mechanism 11 connected by way of the torque converter 9, the forward-reverse switching mechanism 10, and the like, and an output shaft 15 of the continuously variable transmission mechanism 11 connected to the drive wheel 4 by way of the decelerating mechanism 12, the differential gear 13, a drive shaft 16, and the like.

The torque converter 9 is arranged between the engine 3 and the forward-reverse switching mechanism 10, and can amplify (or maintain) the torque of the power transmitted from the engine 3 and transmit the same to the forward-reverse switching mechanism 10. The torque converter 9 includes a pump impeller 9a and a turbine runner 9b, which are arranged facing each other in a freely rotating manner, where the pump impeller 9a is coupled to the crankshaft 8 to be integrally rotatable through a front cover 9c, and the turbine runner 9b is coupled to the forward-reverse switching mechanism 10. The viscous fluid such as a working fluid interposed between the pump impeller 9a and the turbine runner 9b is circulated and flowed with the rotation of the pump impeller 9a and the turbine runner 9b, so that the torque can be amplified and transmitted while tolerating the differential between the input and the output.

The torque converter 9 further includes a lockup clutch 9d which is arranged between the turbine runner 9b and the front cover 9c and coupled to the turbine runner 9b in an integrally rotatable manner. The lockup clutch 9d is activated by the pressure of the oil supplied from the hydraulic pressure control device 1, to be described below, and is switched between an engaged state (lockup ON) and a released state (lockup OFF) with respect to the front cover 9c. In a state where the lockup clutch 9d is engaged with the front cover 9c, the front cover 9c (i.e., pump impeller 9a) and the turbine runner 9b are engaged, the relative rotation of the pump impeller 9a and the turbine runner 9b is regulated, and the differential between the input and the output is prohibited, and hence the torque converter 9 transmits the torque transmitted from the engine 3 to the forward-reverse switching mechanism 10 as is.

The forward-reverse switching mechanism 10 can shift the power (rotation output) from the engine 3 and can also switch the rotating direction. The forward-reverse switching mechanism 10 is configured to include a planetary gear train 17, a forward-reverse switching clutch (forward clutch) C1 and a forward-reverse switching brake (reverse brake) B1 serving as friction engagement elements, and the like. The planetary gear train 17 is a differential mechanism configured to include a sun gear, a ring gear, a carrier, and the like as a plurality of rotation elements that are differentially rotatable with each other, where the forward-reverse switching clutch C1 and the forward-reverse switching brake B1 are engagement elements for switching an activation state of the planetary gear train 17, and for example, can be configured by a friction type engagement mechanism such as a multi-plate clutch, and the like, where a hydraulic wet multi-plate clutch is used herein.

The activation state of the forward-reverse switching mechanism 10 is switched when the forward-reverse switching clutch C1 and the forward-reverse switching brake B1 are activated by the pressure of the oil supplied from the hydraulic pressure control device 1, to be described below. When the forward-reverse switching clutch C1 is in the engaged state (ON state) and the forward-reverse switching brake B1 is in the released state (OFF state), the forward-reverse switching mechanism 10 transmits the power from the engine 3 to the input shaft 14 through forward rotation (direction in which the input shaft 14 rotates when the vehicle 2 moves forward). When the forward-reverse switching clutch C1 is in the released and the forward-reverse switching brake B1 is in the engaged state, the forward-reverse switching mechanism 10 transmits the power from the engine 3 to the input shaft 14 through reverse rotation (direction in which the input shaft 14 rotates when the vehicles 2 moves backward). In the forward-reverse switching mechanism 10, the forward-reverse switching clutch C1 and the forward-reverse switching brake B1 are both in the released state in the neutral state. In the present embodiment, the forward-reverse switching clutch C1 and the forward-reverse switching brake B1 are also collectively referred to as "C1 clutch, and a control system for performing the control of engagement/release of the C1 clutch is collectively referred to as "C1 control system" 18. The C1 clutch and the C1 control system 18 are also collectively expressed simply as "clutch."

The continuously variable transmission mechanism 11 is a transmission that is arranged between the forward-reverse switching mechanism 10 and the drive wheel 4 on the transmission path of the power from the engine 3 to the drive wheel 4, and that shifts the power of the engine 3 and can output the same. The continuously variable transmission mechanism 11 is activated by the pressure of the oil supplied from the hydraulic pressure control device 1, to be described below.

The continuously variable transmission mechanism 11 is a known belt type continuously variable transmission (CVT), for example. The continuously variable transmission mechanism 11 includes a primary pulley 20 arranged on the engine 3 side, a secondary pulley 21 arranged on the drive wheel 4 side, and a belt 22. The primary pulley 20 is coupled to the input shaft 14. The secondary pulley 21 is coupled to the output shaft 15. The belt 22 is bridged between the primary pulley 20 and the secondary pulley 21. The continuously variable transmission mechanism 11 activates a primary pulley side actuator and a secondary pulley side actuator with the pressure of the oil supplied from the hydraulic pressure control device 1, to be described below, and changes the pulley ratio to continuously change the transmission gear ratio. Similarly, the belt sandwiching pressure can be controlled.

The decelerating mechanism 12 reduces the rotation speed of the power from the continuously variable transmission mechanism 11 and transmits the same to the differential gear 13. The differential gear 13 transmits the power from the decelerating mechanism 12 to each drive wheel 4 through each drive shaft 16. The differential gear 13 absorbs the difference in the rotation speed of the drive wheel 4 on the center side of the turn generated when the vehicle 2 turns, that is, between the inner side of the drive wheel 4 and the outer side of the drive wheel 4.

The power transmitting device 5 configured as above can transmit the power generated by the engine 3 to the drive wheel 4 through the torque converter 9, the forward-reverse switching mechanism 10, the continuously variable transmission mechanism 11, the decelerating mechanism 12, the differential gear 13, and the like. As a result, the vehicle 2 generates the driving force [N] at the ground surface with the road surface of the drive wheel 4, so that the vehicle 2 can travel.

The hydraulic pressure control device 1 activates the power transmitting device 5 including the lockup clutch 9d of the torque converter 9, the forward-reverse switching clutch C1 and the forward-reverse switching brake B1 of the forward-reverse switching mechanism 10, the primary pulley 20 and the secondary pulley 21 of the continuously variable transmission mechanism 11, and the like with the hydraulic pressure of the oil serving as fluid. The hydraulic pressure control device 1 is configured to include various hydraulic control circuits controlled by the ECU 7, for example. The hydraulic pressure control device 1 is configured to include a plurality of oil paths, an oil reservoir, an oil pump, a plurality of electromagnetic valves, and the like, and controls the flow rate or the hydraulic pressure of the oil supplied to each unit of the power transmitting device 5 in response to a signal from the ECU 7, to be described below. The hydraulic pressure control device 1 also functions as a lubricating oil supplying device for performing lubrication of a predetermined area of the power transmitting device 5. The details of the configuration of the hydraulic pressure control device 1 will be described below with reference to FIG. 2.

The ECU 7 controls the drive of each unit of the vehicle 2. The ECU 7 is physically an electronic circuit having a well known microcomputer including a central processing unit (CPU), a random access memory (RAM), a read only memory (ROM), and an interface as a main body. The function of the ECU 7 is realized by loading the application program held in the ROM to the RAM and executing the application program with the CPU to operate various types of devices in the vehicle 2 under the control of the CPU and perform read and write of data with respect to the RAM and the ROM. In the present embodiment, the ECU 7 performs the control of each unit of the power transmitting device 5 such as the torque converter 9, the forward-reverse switching mechanism 10, the continuously variable transmission mechanism 11, and the like by controlling the hydraulic pressure control device 1 described above. The ECU 7 is not limited to the functions described above, and also includes various other functions used for the various types of controls of the vehicle 2.

The ECU 7 may have a configuration including a plurality of ECUs such as an engine ECU for controlling the engine 3, a T/M ECU for controlling the power transmitting device 5 (hydraulic pressure control device 1), an S&S ECU for executing an idling stop (S&S (start & stop)) control, and the like.

The ECU 7 is connected with various types of sensors (not illustrated in FIG. 1) in the vehicle 2 and is input with detection signals from the various types of sensors, so that the drive of each unit of the vehicle 2 can be controlled based on the detection signals. In particular, the vehicle 2 of the present embodiment includes a function, a so-called idling stop control (also referred to as "S&S control," "eco-run control" in the present embodiment) of stopping the engine 3 while the vehicle 2 is parked or travelling. The ECU 7 is configured to be able to execute the idling stop control when a predetermined condition is satisfied based on the various types of sensor information.

Figure 2:
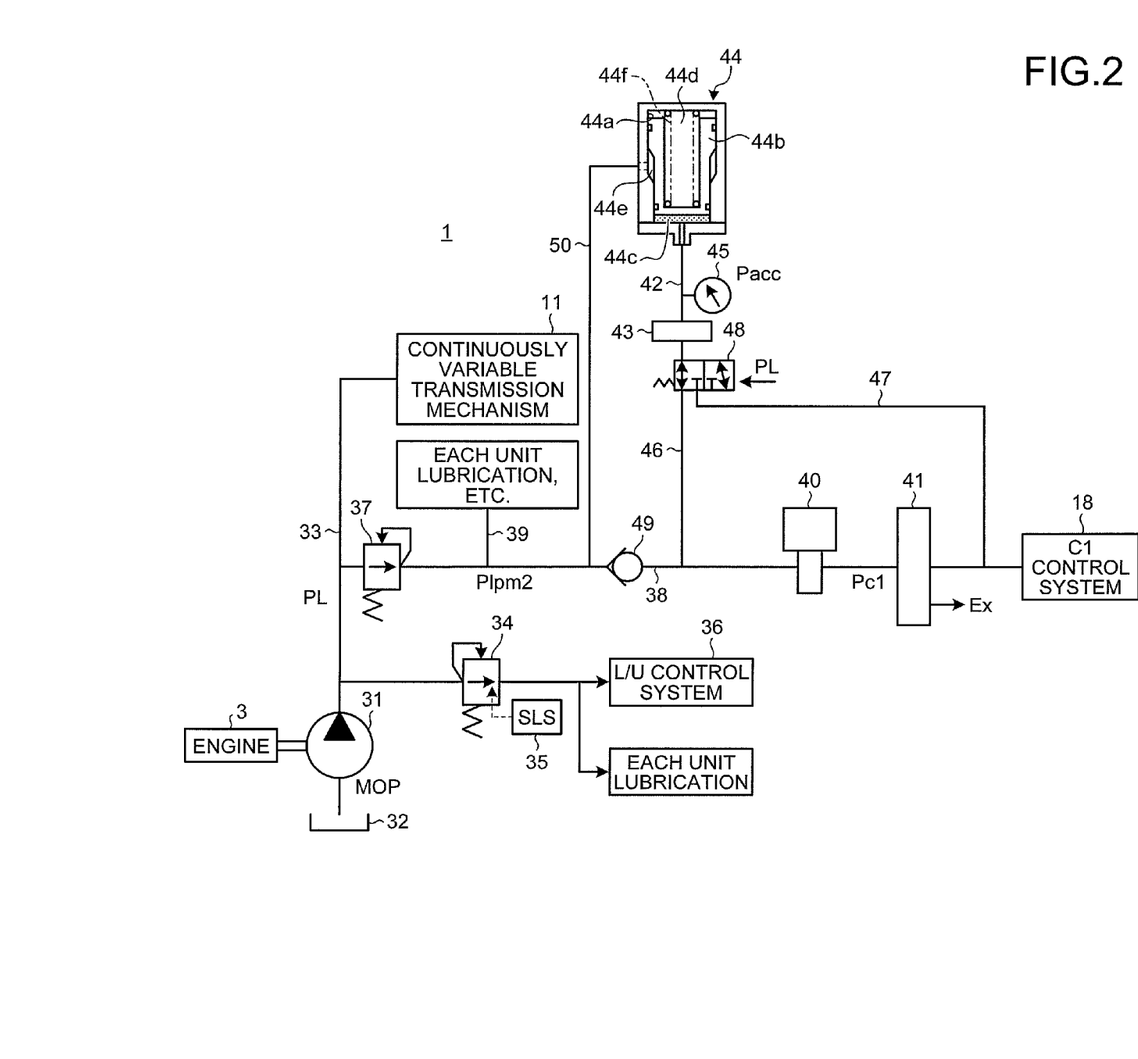
FIG. 2 is a view illustrating a schematic configuration of the hydraulic pressure control device in FIG. 1.

The configuration of the hydraulic pressure control device 1 according to the present embodiment will now be described with reference to FIG. 2. FIG. 2 is a view illustrating a schematic configuration of the hydraulic pressure control device 1 in FIG. 1.

As illustrated in FIG. 2, the hydraulic pressure control device 1 includes a mechanical pump 31 driven by the drive of the engine 3 as an oil supply source for supplying oil to each unit of the power transmitting device 5. The mechanical pump 31 suctions, compresses, and discharges the oil accumulated in a drain 32 of the hydraulic pressure control device 1. The mechanical pump 31 can supply the discharged oil to the power transmitting device 5 through a hydraulic path 33.

The hydraulic path 33 includes a primary regulator valve 34. The primary regulator valve 34 adjusts the hydraulic pressure generated in the mechanical pump 31. The control pressure is supplied to the primary regulator valve 34 by an SLS linear solenoid 35, and the primary regulator valve 34 adjusts the hydraulic pressure in the hydraulic path 33 according to the control pressure. The hydraulic pressure in the hydraulic path 33 adjusted by the primary regulator valve 34 is used for a line pressure PL.

As the primary regulator valve 34, for example, a spool valve can be employed in which a valve body (spool) slidably moves in an axial direction in a valve main body to open/close or switch the flow path, where the hydraulic path 33 is connected to an input port, the SLS linear solenoid 35 is connected to a pilot port for inputting the pilot pressure so that the control pressure is input, and the excess flow generated by the adjustment of the line pressure PL is discharged from the output port.

An L/U control system 36 for controlling the engagement/release of the lockup clutch 9d of the torque converter 9 is connected to the output port of the primary regulator valve 34, where when the excess flow is generated from the primary regulator valve 34, such excess flow is supplied to the L/U control system 36 (or low pressure control system controllable at lower pressure than the continuously variable transmission mechanism 11). The excess flow from the primary regulator valve 34 can be supplied for each unit lubrication in a predetermined area of the power transmitting device 5, and the like. Although not illustrated in FIG. 2, an oil path is formed so that the excess flow supplied to the L/U control system 36, each unit lubrication, and the like is eventually returned to the drain 32.

The mechanical pump 31 is connected to the C1 control system 18 (forward-reverse switching clutch C1 and forward-reverse switching brake B1) of the forward-reverse switching mechanism 10 through the hydraulic path 33 so as to be able to supply the hydraulic pressure adjusted to the line pressure PL by the primary regulator valve 34 with respect to the continuously variable transmission mechanism 11.

An LPM No. 2 valve 37 is arranged on a clutch oil path 38 connected to the C1 control system 18 of the hydraulic path 33. The LPM No. 2 valve 37 is, for example, a spool valve similar to the primary regulator valve 34, and outputs a predetermined hydraulic pressure Plpm2 adjusted (depressurized) with the line pressure PL introduced into the valve as the original pressure. The clutch oil path 38 is connected to a lubricating oil path 39 for supplying the oil of hydraulic pressure Plpm2 to each unit lubrication and the like of a predetermined area in the power transmitting device 5 at the downstream side of the LPM No. 2 valve 37.

An SLC linear solenoid 40 (clutch pressure control valve) is arranged on the clutch oil path 38 on the downstream side of the branching with respect to the lubricating oil path 39. Similar to the SLS linear solenoid 35 and the like, the SLC linear solenoid 40 is an electromagnetic valve for generating the control pressure according to the current value determined by a duty signal (duty value) transmitted from the ECU 7. In the present embodiment, the SLC linear solenoid 40 controls the control pressure (clutch pressure) Pc1 to supply to the C1 control system 18 with the hydraulic pressure Plpm2 as the original pressure.

A manual valve 41 (selection valve) is arranged on the downstream side of the SLC linear solenoid 40 of the clutch oil path 38. The manual valve 41 selects the clutch to supply the oil from the hydraulic path 33, and specifically, switches the connection relationship of the clutch oil path 38 and the C1 control system 18 in cooperation with the shift operation of the driver of the vehicle 2. In other words, the manual valve 41 can switch the communication/blocking of the clutch oil path 38 and the forward-reverse switching clutch C1 and the forward-reverse switching brake B1. For example, if the shift position is "D (drive (forward))", the manual valve 41 connects the clutch oil path 38 to the forward-reverse switching clutch C1 in the C1 control system 18 so that the forward-reverse switching clutch C1 can be controlled. In this case, the manual valve 41 connects the forward-reverse switching brake B1 in the C1 control system 18 to an exhaust port Ex to discharge the oil acting on the forward-reverse switching brake B1 from the exhaust port Ex.

If the shift position is "R (reverse (backward))", the manual valve 41 connects the clutch oil path 38 to the forward-reverse switching brake B1 in the C1 control system 18 so that the forward-reverse switching brake B1 can be controlled. In this case, the manual valve 41 connects the forward-reverse switching clutch C1 in the C1 control system 18 to the exhaust port Ex to discharge the oil acting on the forward-reverse switching clutch C1 from the exhaust port Ex. If the shift position is "N (neutral)", the manual valve 41 blocks both the forward-reverse switching clutch C1 and the forward-reverse switching brake B1 with respect to the clutch oil path 38 and connects the same to the exhaust port Ex. The oil acting on the forward-reverse switching clutch C1 and the forward-reverse switching brake B1 is thereby discharged from the exhaust port Ex.

An accumulator 44 is connected on the clutch oil path 38. The accumulator 44 interiorly accumulates and holds (accumulates) the hydraulic pressure supplied from the mechanical pump 31 at the time of the drive of the mechanical pump 31, and supplies the held hydraulic pressure to the C1 control system 18 as necessary.

Figure 3:
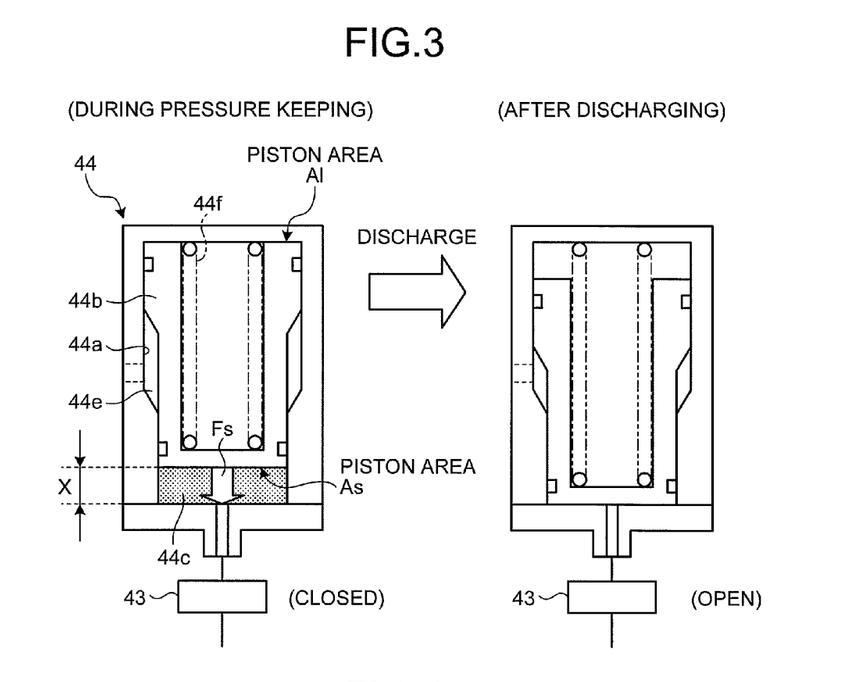
FIG. 3 is a schematic view for explaining a discharging operation of an accumulator in FIG. 2.
Figure 4:
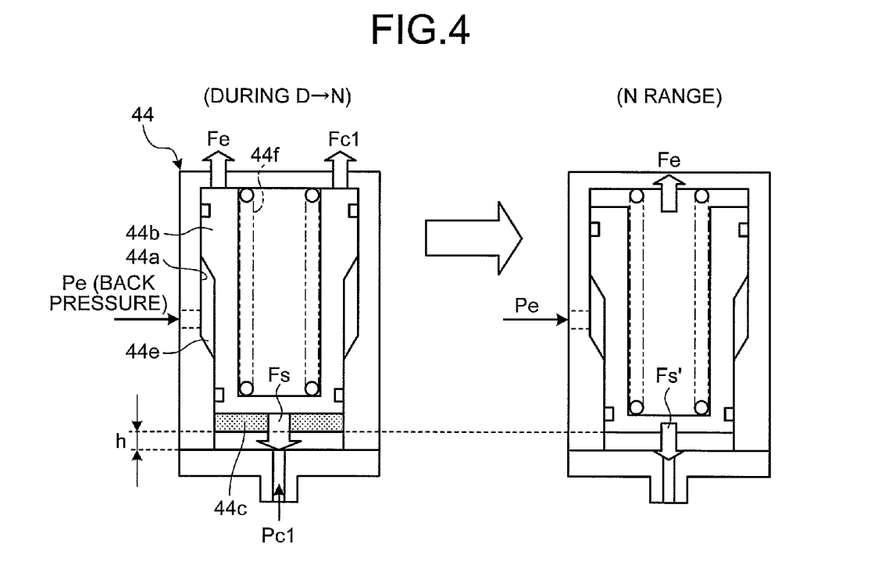
FIG. 4 is a schematic view for explaining a dumper operation of the accumulator in FIG. 2.
Figure 5:
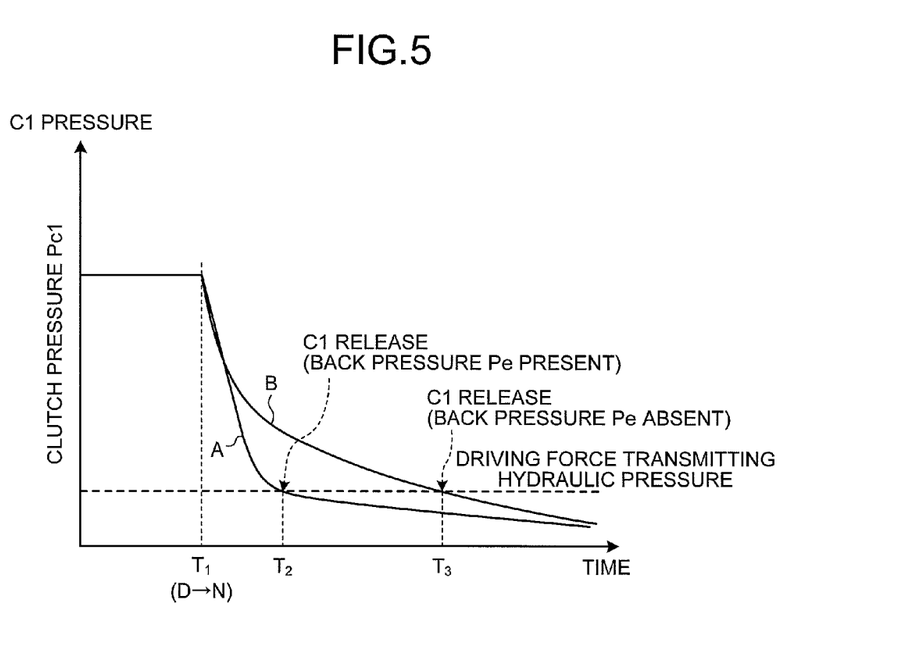
FIG. 5 is a timing chart illustrating a time transition of a clutch pressure Pc1 when the accumulator is used for a dumper function.

The configuration and the operation of the accumulator 44 will be described below with reference to FIGS. 3 to 5 in addition to FIG. 2. FIG. 3 is a schematic view for explaining the discharging operation of the accumulator 44, FIG. 4 is a schematic view for explaining the dumper operation of the accumulator 44, and FIG. 5 is a timing chart illustrating a time transition of the clutch pressure Pc1 when the accumulator 44 is used as a dumper.

The accumulator 44 includes a stepped piston 44b fitted to be slidably movable in one direction in a stepped cylinder 44a. A small diameter portion of the stepped piston 44b forms an accumulation chamber 44c for accumulating the oil at a small diameter side end of the stepped cylinder 44a, where the volume of the accumulation chamber 44c can be changed by the movement of the stepped piston 44b.

The accumulation chamber 44c of the accumulator 44 is connected to a connecting oil path 42 for communicating the accumulator 44 and the hydraulic path 33, where introduction of oil to the accumulation chamber 44c at the time of accumulation and discharging of oil from the accumulation chamber 44c at the time of discharge are carried out through the connecting oil path 42.

A first back pressure chamber 44d is formed by a large diameter portion of the stepped piston 44b at a large diameter side end in the stepped cylinder 44a of the accumulator 44. A spring 44f for biasing the stepped piston 44b toward the accumulation chamber 44c is arranged in the first back pressure chamber 44d, where the biasing force is changed, that is, the magnitude of the back pressure can be changed according to the deformation of the spring 44f accompanied by the slidable movement of the stepped piston 44b. At the time of accumulation of the accumulator 44, the stepped piston 44b is pushed in thus expanding the volume of the accumulation chamber 44c and accumulating the oil inside, where a state in which the back pressure and the pressure (accumulator pressure Pacc) of the oil accumulated in the accumulation chamber 44c are balanced is obtained. At the time of discharging of the accumulator 44, the piston is pushed out using the biasing force of the spring 44f to discharge the accumulated oil from the inside, and supply the same to the C1 control system 18.

The back pressure that can be generated by the spring 44f takes a maximum value in a state where the large diameter side end face of the stepped piston 44b is abutted on the large diameter side end of the stepped cylinder 44a. The maximum value of the back pressure can be set in advance by adjusting the spring length, spring constant, and the like of the spring 44f so as to realize a pressure of an extent that the clutch pressure Pc1 can at least be maintained at a pack plugging pressure when the oil from the accumulator 44 is discharged, for example. The "pack plugging pressure" is the hydraulic pressure at which the working fluid can be filled in the clutch pack (working fluid chamber of the C1 clutch) so that a state in which the clutch plate of the C1 clutch abuts on (plugged) to the friction material is obtained.

A second back pressure chamber 44e is formed between a stepped portion of the stepped cylinder 44a and a stepped portion of the stepped piston 44b of the accumulator 44. The accumulator 44 is configured to adjust the back pressure of the stepped piston 44b by adjusting the oil supply amount to the second back pressure chamber 44e. When the oil supply amount to the second back pressure chamber 44e is increased, the balanced position of the stepped piston 44b moves in the direction of the large diameter side end of the stepped cylinder 44a, thus reducing the discharging capacity of the oil from the accumulation chamber 44c. The second back pressure chamber 44e is connected to a back pressure control oil path 50 (third oil path), and the oil introduction/discharge is carried out through the back pressure control oil path 50.

The pressure accumulation and discharging of the accumulator 44 are controlled by an accumulation control valve 43 arranged on the connecting oil path 42. The oil is accumulated inside the accumulator 44 by closing the accumulation control valve 43, and the accumulated oil is discharged by opening the accumulation control valve 43. The opening/closing operation of the accumulation control valve 43 is controlled by the ECU 7. The accumulation control valve 43 is, for example, an electromagnetic poppet valve, and the opening/closing is switched by adjusting the supply current by the ECU 7. The accumulation control valve 43 may be, for example, a normally-closed type valve that is opened when the current is supplied and that is normally closed when the current is not supplied. The accumulation control valve 43 may use other valve structures such as the spool valve.

A pressure sensor 45 for detecting the pressure (accumulator pressure) Pacc of the oil accumulated in the accumulator 44 is arranged between the accumulator 44 and the accumulation control valve 43, and is configured to transmit the information of the detected accumulator pressure Pacc to the ECU 7.

In the present embodiment, in particular, the accumulator 44 and the accumulation control valve 43 are connected to two oil paths, first oil path 46 and second oil path 47, by way of the connecting oil path 42, and are communicably connected to the hydraulic path 33 (clutch oil path 38) by the first oil path 46 and the second oil path 47.

The position where the first oil path 46 is connected to the hydraulic path 33 is on the upstream side of the SLC linear solenoid 40, and is preferably on the downstream side of the LPM No. 2 valve 37, and more preferably on the downstream side from the branching with respect to the lubricating oil path 39 in the clutch oil path 38 of the hydraulic path 33.

The position where the second oil path 47 is connected to the hydraulic path 33 is on the downstream side of the manual valve 41. In other words, the second oil path 47 is connected at the position of the hydraulic path 33 where the hydraulic pressure of the same level as the hydraulic pressure actually supplied to the C1 clutch and the C1 control system 18 is obtained.

The ends on the side opposite to the sides of connecting with the hydraulic path 33 of the first oil path 46 and the second oil path 47 are connected to a switching valve 48. The switching valve 48 is also connected to the accumulator 44 by way of the connecting oil path 42, and selects either the first oil path 46 or the second oil path 47 and communicates the accumulator 44 and the hydraulic path 33 (clutch oil path 38).

The switching valve 48 can switch the oil path to select by the line pressure PL generated by the drive of the engine 3. More specifically, when the mechanical pump 31 is driven at the time of the drive of the engine 3 and a predetermined line pressure PL or higher is generated, the switching is carried out such that the accumulator 44 can communicate with the hydraulic path 33 (clutch oil path 38) by way of the second oil path 47 (in the configuration illustrated in FIG. 2, the switching valve 48 is moved toward the left side by the PL). When the drive of the mechanical pump 31 is stopped at the time of the stop of the engine 3 and the line pressure PL is lowered to a predetermined pressure or lower, the switching is carried out such that the accumulator 44 can communicate with the hydraulic path 33 (clutch oil path 38) by way of the first oil path 46 (in the configuration illustrated in FIG. 2, the switching valve 48 is moved toward the right side by the spring).

In the present embodiment, according to such configuration of the switching valve 48, the first oil path 46, and the second oil path 47, the switching valve 48 is switched to communicate with the second oil path 47 at the time of normal travelling of the vehicle, that is, in a state where the engine 3 is driven and the mechanical pump 31 is discharging the oil of the line pressure PL. In this case, the accumulator 44 is connected to the hydraulic path 33 on the downstream side of the manual valve 41 through the second oil path 47. Furthermore, the accumulating process of accumulating the oil in the accumulator 44 can be performed by appropriately opening the accumulation control valve 43 and then closing thereafter in such state. In the state in which the accumulating process of the accumulator 44 is performed and the pressure is kept, for example, as illustrated as a state of "during pressure keeping" on the left side in FIG. 3, the accumulation control valve 43 is closed and the oil having the accumulator pressure Pacc corresponding to the pack plugging pressure is held in the accumulation chamber when the stepped piston 44b abuts on the large diameter side end of the stepped cylinder 44a and the accumulation chamber 44c becomes a maximum volume in the accumulator 44.

The vehicle 2 of the present embodiment, in particular, is configured to be able to perform the idling stop control, as described above, and can execute the idling stop travelling of travelling in a state where the stop of the engine 3 and the release of the C1 clutch are both performed if a predetermined condition is met during the travelling of the vehicle 2 such as at the time of decelerating travelling, in particular. During the execution of such idling stop travelling, the engine 3 is stopped and the mechanical pump does not output the oil of the line pressure PL, and thus the switching valve 48 is switched to communicate with the first oil path 46 in the present embodiment. In this case, the accumulator 44 is connected to the hydraulic path 33 on the upstream side of the SLC linear solenoid 40 through the first oil path 46.

In this state, the mechanical pump 31 does not discharge oil, and thus the line pressure PL of the hydraulic path 33 lowers and the clutch pressure of a magnitude sufficient to control the C1 clutch may not be output. When returned from the idling stop travelling and the engine return request is made, the engine 3 is readily restarted and the hydraulic pressure supplied to the C1 control system 18 is desirably increased up to the pack plugging pressure to control the C1 control system 18 so as to obtain a state immediately before the C1 clutch is engaged to enhance the responsiveness of the C1 clutch.

In the present embodiment, at the time of returning from the idling stop control performed while the vehicle is stopping or travelling, the accumulation control valve 43 is opened at an appropriate timing with the switching valve 48 communicating to the first oil path 46, so that the discharging process of discharging the oil accumulated in the accumulator 44 can be performed. In this case, the oil accumulated in the accumulator 44 is discharged to the hydraulic path 33 on the upstream side of the SLC linear solenoid 40 through the first oil path 46. Thus, the original pressure Plpm2 for generating the clutch pressure Pc1 by the SLC linear solenoid 40 is increased, where the clutch pressure Pc1 becomes the pack plugging pressure by appropriately controlling the SLC linear solenoid 40.

After the discharging process of the accumulator 44 is performed, the stepped piston 44b is abutted on the small diameter side end of the stepped cylinder 44a by the biasing force of the spring 44f, and the oil accumulated in the accumulation chamber 44c is discharged through the connecting oil path 42 in the accumulator 44, as illustrated as a state of "after discharging" on the right side in FIG. 3.

A check valve 49 is arranged on the upstream side of the connecting position of the first oil path 46 on the clutch oil path 38 (position downstream of the lubricating oil path 39 in the example of FIG. 2), where leakage and backflow toward the upstream side of the oil discharged from the accumulator 44 are prevented to efficiently increase the hydraulic pressure Plpm2 by the accumulator 44 in the discharging process of the accumulator 44.

In the present embodiment, the switching valve 48 and the accumulation control valve 43 function as "connection control means" for communicably connecting the accumulator 44 to either the first oil path 46 or the second oil path 47 and controlling the connection between the accumulator 44 and the hydraulic path 33 (clutch oil path 38).

The back pressure control oil path 50 (third oil path) connected to the second back pressure chamber 44e of the accumulator 44 is connected to the hydraulic path 33 (clutch oil path 38) at the upstream side of the check valve 49. In other words, the back pressure control oil path 50 is configured to introduce the oil having the hydraulic pressure Plpm2 of the clutch oil path 38 generated during the activation of the mechanical pump 31 to the second back pressure chamber 44e of the accumulator 44.

When the shift operation is carried out by the driver during the travelling of the vehicle, the manual valve 41 displaces according to the shift position. According to the displacement of the manual valve 41, a situation where the state of communicating/blocking the flow of oil in the clutch oil path 38 switches occurs. For example, if the shift position is switched from D to N, the forward-reverse switching clutch C1 of the C1 control system 18 is switched from the communicating state to the blocking state with respect to the clutch oil path 38. The oil remaining between the forward-reverse switching clutch C1 and the manual valve 41 is discharged from the exhaust port Ex of the manual valve 41. When such situation where the manual valve 41 shifts occurs, drawbacks may occur in the control of the C1 clutch such as the clutch pressure Pc1 supplied to the C1 control system 18 rapidly fluctuating, and the C1 clutch rapidly opening or rapidly engaging thus causing shock (this is also referred to as "D-N shock" in the present embodiment).

In the present embodiment, the accumulation control valve 43 is opened if a predetermined condition (details will be described below with reference to FIG. 8) is met with the accumulator 44 communicating with the hydraulic path 33 on the downstream side of the manual valve 41 through the second oil path 47 at the time of normal travelling of the vehicle. The accumulator 44 thus can be used for a damper function, and the fluctuation of the clutch pressure Pc1 can be alleviated by absorbing the fluctuation of the clutch pressure Pc' caused by the displacement of the manual valve 41 with the accumulator 44.

In a situation where the accumulator 44 is used for the dumper function, the vehicle 2 is normally travelling and the engine 3 and the mechanical pump 31 are driven, and thus a constant back pressure Pe (hydraulic pressure Plpm2 in the present embodiment) is introduced from the back pressure control oil path 50 to the second back pressure chamber 44e of the accumulator 44. Thus, the stepped piston 44b of the accumulator 44 can be moved, the region activated by the spring can be reduced, and the discharging capacity and the hydraulic level of the accumulator 44 can be lowered to the performance necessary for the dumper. This will be specifically described with reference to FIGS. 3 and 4.

First, the performance of the accumulator 44 at the during pressure keeping (pressure accumulation) and at the time of discharging of the accumulator 44 will be described with reference to FIG. 3.

As illustrated in FIG. 3, at the during pressure keeping and at the time of discharging of the accumulator 44, the oil is not introduced to the second back pressure chamber 44e since the engine 3 is stopped. At the during pressure keeping when the accumulation control valve 43 is closed, only the biasing force Fs of the spring 44f acts on the stepped piston 44b, as illustrated on the left side in FIG. 3. The biasing force Fs in this case can be expressed with the following equation (1).

$$Fs = k \cdot X \tag{1}$$

Here, k is a spring constant of the spring 44f, and X is the height of the accumulation chamber 44c at the during pressure keeping.

The pressure (accumulator pressure) Pacc (initial hydraulic pressure) of the oil kept in the accumulation chamber 44c can be expressed with the following equation.

$$Pacc = Fs/As = k \cdot X/As \tag{2}$$

Here, As is the area of the end face on the small diameter side (lower side in FIGS. 3 and 4).

The volume Vacc of the oil accumulated in the accumulation chamber 44c can be expressed with the following equation (3).

$$Vacc = As \cdot X \tag{3}$$

As illustrated on the right side in FIG. 3, when the accumulation control valve 43 is opened, the stepped piston 44b is pushed out by the biasing force Fs of the spring 44f, and the oil having the hydraulic pressure Pacc and the volume Vacc kept in the accumulation chamber 44c is discharged. Thus, at the during pressure keeping (accumulation) and at the time of discharging, the performance of the accumulator 44 can express the accumulatable hydraulic pressure as Pacc, and the dischargeable amount (discharging volume) of the oil as Vacc.

The performance of the accumulator 44 when the accumulator 44 is used as the dumper function will now be described with reference to FIG. 4.

As illustrated in FIG. 4, in a situation where the accumulator 44 is used for the dumper function, the back pressure Pe is supplied to the second back pressure chamber 44e of the accumulator 44 since the engine 3 and the mechanical pump 31 are in driving.

If there is no flow of oil from the clutch oil path 38 side and the clutch pressure Pc1 does not act, the force Fe by the back pressure Pe and the biasing force Fs' by the spring 44f act on the stepped piston 44b, as illustrated on the right side in FIG. 4. In this case, the stepped piston 44b is maintained at a position where Fe and Fs' are balanced (i.e., Fe=Fs') and the height of the accumulation chamber 44c becomes h.

Two forces acting on the stepped piston 44b, that is, the force Fe by the back pressure Pe and the biasing force Fs' by the spring 44f, can be expressed with the following equation (4) and equation (5), respectively.

$$Fe=Pe \cdot (Al-As) \quad (4)$$

$$Fs'=k \cdot h \quad (5)$$

Here, Al is the area of the end face on the large diameter side (upper side in FIGS. 3 and 4) of the stepped piston 44b.

The height h of the accumulation chamber indicating the position of the piston where Fe and Fs' are balanced can be expressed with the following equation (6) by substituting equation (4) and equation (5) to the relationship of Fe=Fs'.

$$h=Pe \cdot (Al-As)/k \quad (6)$$

Consider a case in which the operation of transitioning the manual valve 41 from D to N is performed, for example. In this case, the oil of the clutch pressure Pc1 accumulated in the clutch oil path 38 between the C1 control system 18 and the manual valve 41 is flowed into the accumulation chamber 44c of the accumulator 44 through the second oil path 47 and the connecting oil path 42. Thus, as illustrated on the left side in FIG. 4, the biasing force Fs (see equation (1)) by the spring 44f, the force Fe by the back pressure Pe, and the force Fc1 by the clutch pressure Pc1 act on the stepped piston 44b, and the stepped piston 44b is pushed in up to the position where the forces become balanced (Fs−Fe−Fc1=0).

In this case, the hydraulic pressure Pdumper of the oil in the accumulation chamber 44c can be expressed with the following equation (7) by the relationship of Fc1=Fs−Fe and the above equations (2) and (4).

$$Pdumper=Fc1/As=(Fs-Fe)/As=Pacc-Pe \cdot (Al-As)/As \quad (7)$$

The discharging volume Vdumper is the volume of an amount the stepped piston 44b is pushed in from the balanced position h as illustrated on the right side in FIG. 4, and thus can be expressed with the following equation (8).

$$Vdumper=Vacc-As \cdot h=Vacc-Pe \cdot As \cdot (Al-As)/k \quad (8)$$

Therefore, when using the accumulator 44 as the dumper, the oil of the clutch pressure Pc1 of the clutch oil path 38 flows into the accumulation chamber 44c from a state in which the stepped piston 44b is balanced at the position of the height h of the accumulation chamber 44c, as illustrated on the right side in FIG. 4, in the accumulator 44. As illustrated on the left side in FIG. 4, after the state in which the stepped piston is pushed in to the state in which the biasing force Fs by the spring 44f, the force Fe by the back pressure Pe, and the force Fc1 by the clutch pressure Pc1 are balanced, the oil having the hydraulic pressure Pdumper and the volume Vdumper pressure kept in the accumulation chamber 44c is discharged. The stepped piston 44b is then again in a balanced state at the position of the height h of the accumulation chamber 44c, and the oil discharged from the accumulator 44 is discharged from the exhaust port Ex of the manual valve 41.

That is, when using the accumulator as the dumper, the performance of the accumulator 44 is the same as when the accumulatable hydraulic pressure is Pdumper and the dischargeable amount (discharging volume) of the oil is Vdumper.

According to equation (7) and equation (8), the hydraulic pressure Pdumper and the discharging volume Vdumper at the time of dumper use are lower than the hydraulic pressure Pacc and the discharging amount Vacc at the time of accumulation and discharging. That is, at least two types of performances can be obtained with a single accumulator by introducing the back pressure Pe, and the discharging volume and the hydraulic pressure level can be lowered to the performance necessary for the dumper when using the accumulator for the dumper function.

The reduction amount of the hydraulic pressure level and the discharging volume at the time of dumper function use can be controlled by adjusting the back pressure Pe to be introduced to the second back pressure chamber 44e, the area Al of the large diameter portion of the stepped piston 44b, and the area As of the small diameter portion.

The difference in the behavior of the clutch pressure Pc1 when supplying the back pressure Pe and when not supplying the back pressure Pe upon using the accumulator 44 for the dumper function will be described below with reference to FIG. 5. FIG. 5 illustrates the time transition of the clutch pressure Pc1 supplied to the forward-reverse switching clutch C1 when the shift position transitioned from D to N. Graph A in the figure illustrates the time transition of the clutch pressure Pc1 when the back pressure Pe is supplied to the accumulator 44, and graph B illustrates the time transition of the clutch pressure Pc1 when the back pressure Pe is not supplied to the accumulator 44.

Before time T1, the shift position is at D, the forward-reverse switching clutch C1 is communicating with the clutch oil path 38, and the clutch pressure Pc1 is maintained at a predetermined value. At time T1, when the manual valve 41 is shifted from D to the position corresponding to N, the clutch oil path 38 leading to the forward-reverse switching clutch C1 is blocked with the upstream side of the manual valve 41 and connected with the exhaust port Ex of the manual valve, and the oil remaining in the clutch oil path 38 starts to be discharged from the exhaust port.

In the state in which the back pressure Pe is not supplied, the accumulator 44 functions as the dumper having the discharging volume Vacc, and thus the speed of the oil discharge from the C1 control system 18 is alleviated and the reduction rate of the clutch pressure Pc1 also becomes relatively small, as illustrated in the graph B. At time T3, the clutch pressure Pc1 is reduced to lower than or equal to the driving force transmitting hydraulic pressure (hydraulic pressure at which the forward-reverse switching clutch C1 can transmit the driving force), thus opening the forward-reverse switching clutch C1.

In the state in which the back pressure Pe is supplied, the accumulator 44 functions as the dumper of the discharging volume Vdumper. The discharging volume Vdumper is smaller than the Vacc as illustrated in the above equation (8), and hence in this case, the speed of oil discharge from the C1 control system 18 becomes faster than that in the graph B (case in which the back pressure is not supplied), and, the reduction rate of the clutch pressure Pc1 becomes greater than that in the graph B (case in which the back pressure is not supplied), as illustrated in the graph A. Thus, at time T2, which is earlier than time T3, the clutch pressure Pc1 is reduced to lower than or equal to the driving force transmitting hydraulic pressure, thus opening the forward-reverse switching clutch C1.

Figure 6:
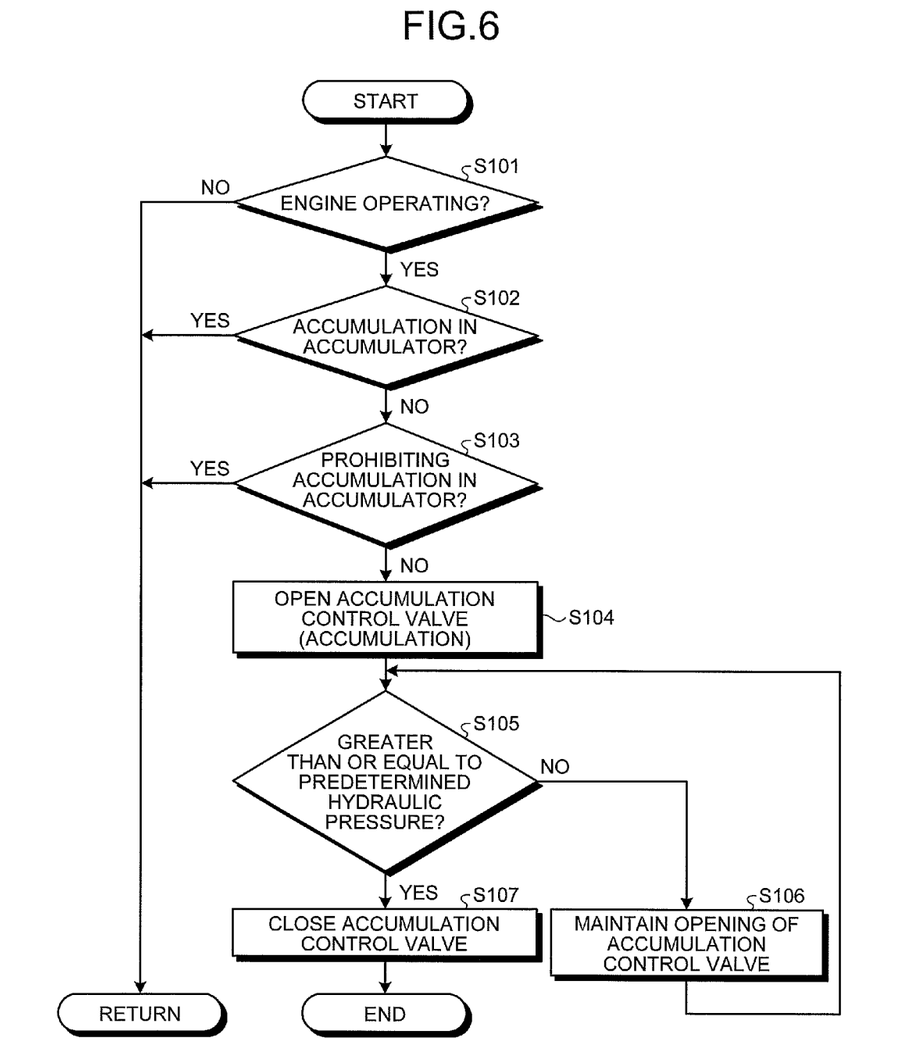
FIG. 6 is a flowchart illustrating an accumulating process of the accumulator performed by the hydraulic pressure control device of the present embodiment.
Figure 7:
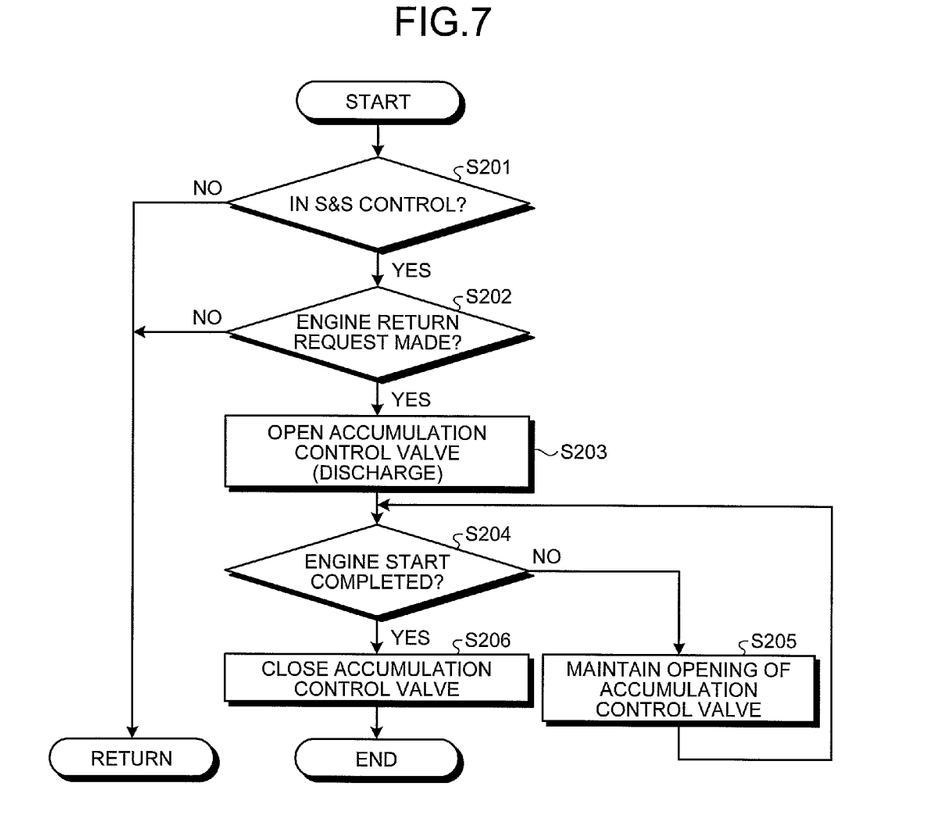
FIG. 7 is a flowchart illustrating a discharging process of the accumulator performed by the hydraulic pressure control device of the present embodiment.
Figure 8:
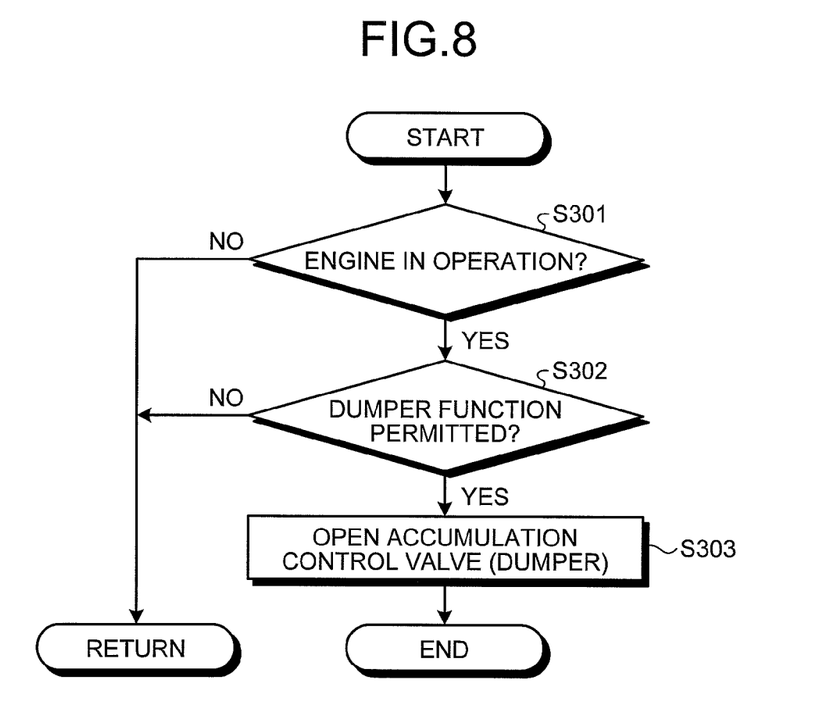
FIG. 8 is a flowchart illustrating the process of using the accumulator as the dumper performed by the hydraulic pressure control device of the present embodiment.

The operation of the hydraulic pressure control device 1 according to the present embodiment will now be described with reference to FIGS. 6 to 8. FIG. 6 is a flowchart illustrating the accumulating process of the accumulator 44 performed by the hydraulic pressure control device 1 of the present embodiment, FIG. 7 is a flowchart illustrating the discharging process of the accumulator 44 performed by the hydraulic pressure control device 1 of the present embodiment, and FIG. 8 is a flowchart illustrating the process of using the accumulator 44 as the dumper performed by the hydraulic pressure control device 1 of the present embodiment. Each process illustrated in FIGS. 6 to 8 is performed by the ECU 7 using the accumulation control valve 43 of the hydraulic pressure control device 1, various types of sensor information of the vehicle 2, and the like.

First, the accumulating process of the accumulator 44 in the hydraulic pressure control device 1 according to the present embodiment will be described with reference to FIG. 6. This process is performed at the time of non-execution of the idling stop control, in other words, during the normal travelling of the vehicle 2. When referring to during normal travelling, this usually refers to a state in which the engine 3 is driven and the mechanical pump 31 is activated. In the initial state of the process, the accumulation control valve 43 is closed.

First, whether or not the engine 3 is operating is checked (S101). The process proceeds to step S102 if the engine 3 is operating. The process returns to step S101 if the engine 3 is stopped.

If it is determined that the engine 3 is operating in step S101, whether or not there is already accumulation in the accumulator 44 is checked (S102). The process proceeds to step S103 if there is no accumulation in the accumulator 44. The process returns to step S101 if there is accumulation in the accumulator 44.

If it is determined that there is no accumulation in the accumulator 44 in step S102, the prohibiting condition of the accumulating process of the accumulator 44 is satisfied, and whether or not in prohibiting the accumulation is checked (S103). The prohibiting condition of the accumulating process can, for example, include cases where the clutch pressure Pc1 is controlled by the SLC linear solenoid 40 and quick response is necessary for the control of the C1 control system 18 such as when the control of releasing the forward-reverse switching clutch C1 is carried out immediately before shifting to the idling stop travelling, when the control of returning from the idling stop travelling and engaging the forward-reverse switching clutch C1 is carried out, and the like. The prohibiting conditions can also include cases where the consumption flow rate of the hydraulic path 33 (valve body) is large such as when the engine rotation number is low, the oil temperature in the hydraulic pressure control device 1 is high, when the gear changing speed is large, and the like.

If in prohibiting the accumulation in step S103, the process returns to step S101 with the accumulation control valve 43 closed (valve closed). If not in prohibiting the accumulation, the accumulation control valve 43 is opened (valve opened) (S104). The oil is introduced into the accumulator 44 from the clutch oil path 38, and accumulated in the accumulator 44. In this case, the line pressure PL generates since the engine 3 is operating, so that the switching valve 48 is switched to communicate the second oil path 47, and the accumulator 44 introduces the oil from the clutch oil path 38 on the downstream side of the manual valve 41 through the second oil path 47.

Whether or not the accumulator pressure Pacc is greater than or equal to the predetermined hydraulic pressure is then checked (S105). If greater than or equal to the predetermined hydraulic pressure, the accumulation control valve 43 is closed assuming the accumulation of the accumulator 44 is sufficiently carried out (S107), and the process is terminated. If the predetermined hydraulic pressure is not reached, the opening (valve open) of the accumulation control valve 43 is maintained (S106), and the process returns to step S105.

The discharging process of the accumulator 44 in the hydraulic pressure control device 1 according to the present embodiment will now be described with reference to FIG. 7. This process is performed at the time of execution of the idling stop control. As a premise for the process of FIG. 7, the accumulating process illustrated in FIG. 6 is already executed, and the accumulation control valve 43 is closed when the accumulator pressure Pacc is greater than or equal to the predetermined value.

First, whether or not the S&S control (idling stop control) is in execution is checked (S201). The process proceeds to step S202 if the S&S control is in execution. The process returns to step S201 if the S&S control is not in execution.

Whether or not the engine return request is made is checked next (S202). The engine return request is a command to return from the idling stop travelling to the engine travelling, and is detected with a state such as when the brake is turned OFF, the negative pressure of the brake is lowered, the battery voltage is lowered, and the like, for example, as a trigger.

If the engine return request is not made in step S202, the oil in the accumulator 44 is kept pressure with the accumulation control valve 43 closed, and the process returns to step S201.

If the engine return request is made in step S202, the accumulation control valve 43 is opened (open valve) assuming there is a need to raise the clutch pressure Pc1 up to the pack plugging pressure before the engagement control of the forward-reverse switching clutch C1 is performed after the restart of the engine 3 (S203), and an engine startup request is issued to the starter therewith so that the restart control of the engine 3 is started. The engine 3 is stopped in this case and hence the line pressure PL is not generated, whereby the switching valve 48 is switched to communicate the first oil path 46. Thus, the accumulator 44 discharges the oil to the clutch oil path 38 on the upstream side of the SLC linear solenoid 40 through the first oil path 46. The hydraulic pressure Plpm2, which becomes the original pressure of the clutch pressure Pc1 controlled by the SLC linear solenoid 40, thus can be increased, the clutch pressure Pc1 can be increased, and the pack plugging pressure (approximately about 0.1 MPa) can be generated.

Then, whether or not the engine start is completed is checked (S204). If the engine start is not completed, the process returns to step S204 with the accumulation control valve 43 opened (open valve) (S205). If the engine start is completed, the accumulation control valve 43 is closed (S206) to enhance the control responsiveness of the clutch pressure Pc1 by the SLC linear solenoid 40, thus preventing the oil supplied from the mechanical pump 31 from flowing into the accumulator 44 from the hydraulic path 33.

The process using the accumulator 44 for the dumper function in the hydraulic pressure control device 1 according to the present embodiment will now be described with reference to FIG. 8. This process is performed during the normal travelling of the vehicle 2 (state in which the vehicle is travelling or stopped and the engine is operating).

First, whether or not the engine 3 is operating is checked (S301). The process proceeds to step S302 if the engine 3 is operating. The process returns to before S301 if the engine 3 is stopped.

If it is determined that the engine is operating in step S301, whether or not the use of the accumulator 44 for the dumper function is permitted is checked (S302). A preferred situation of using the accumulator 44 for the dumper function includes a situation where operation in which the shift position transitions from D (drive) to other gear positions such as R (reverse), N (neutral), P (parking), and the like occurs when the vehicle 2 is parked, and the like. When such shift operation is performed, the manual valve 41 displaces according to the shift operation, and hence the clutch pressure Pc1 fluctuates.

For the condition (dumper function permitting condition) for determining the occurrence of such situation, for example, detection when the vehicle speed becomes zero, when the shift operation is actually performed, and the like can be set. Determination can be made that the use of the accumulator 44 for the dumper function is permitted when the dumper function permitting condition is satisfied.

If it is determined that the dumper function is not permitted in step S302, the process returns to step S301.

If it is determined that the dumper function is permitted in step S302, the accumulation control valve 43 is opened (S303). In this case, the engine 3 is operating and the line pressure PL is generated, and thus the switching valve 48 is switched to communicate the second oil path 47, and the accumulator 44 communicates with the clutch oil path 38 on the downstream side of the manual valve 41 through the second oil path 47. When the shift operation is carried out in such a state so that the manual valve 41 displaces, and the clutch pressure Pc1, which is the supply hydraulic pressure to the C1 control system 18, fluctuates in this state, the fluctuating amount is introduced to the accumulator 44 through the second oil path 47, whereby that the fluctuation of the clutch pressure Pc1 is suppressed.

Furthermore, in this case, the mechanical pump 31 is operating and the hydraulic pressure Plpm2 on the clutch oil path 38 is generated, and hence the hydraulic pressure is introduced to the second back pressure chamber 44*e* of the accumulator 44 through the back pressure control oil path 50 as the back pressure Pe. Thus, the discharging capacity of the accumulator 44 reduces and the performance of the dumper function enhances, as described with reference to FIGS. 4 and 5.

The operation effects of the hydraulic pressure control device 1 according to the present embodiment will be described below.

The hydraulic pressure control device 1 of the present embodiment includes the mechanical pump 31 for discharging oil by the drive of the engine 3 of the vehicle 2, the hydraulic path 33 (clutch oil path 38) for supplying the oil discharged by the mechanical pump 31 to the C1 control system 18, the SLC linear solenoid 40, arranged on the hydraulic path 33, for controlling the clutch pressure Pc1, which is the hydraulic pressure to supply to the C1 control system 18, and the manual valve 41, arranged on the downstream of the SLC linear solenoid 40 of the hydraulic path 33, for selecting the clutch (forward-reverse switching clutch C1 or forward-reverse switching brake B1) to supply the oil from the hydraulic path 33. The hydraulic pressure control device 1 includes the accumulator 44 for accumulating the oil supplied by the mechanical pump 31 and discharging the accumulated oil to supply to the C1 control system 18, the first oil path 46 connected to the hydraulic path 33 (clutch oil path 38) at the upstream side of the SLC linear solenoid 40, the second oil path 47 connected to the hydraulic path 33 (clutch oil path 38) at the downstream side of the manual valve 41, the connection control means (switching valve 48, accumulation control valve 43) for controlling the connection between the accumulator 44 and the hydraulic path 33 to communicate the accumulator 44 with either the first oil path 46 or the second oil path 47, and the back pressure control oil path 50 for supplying the oil supplied by the mechanical pump 31 toward the back pressure side of the accumulator 44.

According to such configuration, the accumulator 44 can be connected to the hydraulic path 33 (clutch oil path 38) through either the first oil path 46 or the second oil path 47. The accumulator 44 is connected to the hydraulic path 33 (clutch oil path 38) at the upstream side of the SLC linear solenoid 40 with the accumulator 44 communicated to the second oil path 47. If the oil accumulated in the accumulator 44 is discharged in this state, the original pressure Plpm2 of the clutch pressure Pc1 generated by the SLC linear solenoid 40 can be increased and the clutch pressure Pc1 can be controlled to the pack plugging pressure. That is, in this state, the accumulator 44 can be effectively used for the pressure accumulating/discharging function for ensuring the pack plugging pressure to supply to the C1 control system 18 at the time of engine restart when returning from the idling stop control.

In a state where the accumulator 44 is communicated to the first oil path 46, the accumulator 44 is connected to the hydraulic path 33 (clutch oil path 38) at the downstream side of the manual valve 41. By communicating the accumulator 44 to the clutch oil path 38 in this state, the oil can be introduced from the clutch oil path 38 to the accumulator 44, and hence the fluctuation of the clutch pressure Pc1 by the displacement of the manual valve 41 can be absorbed. Furthermore, since the oil supplied by the mechanical pump 31 is supplied toward the back pressure side of the accumulator 44 by the back pressure control oil path 50, the discharging capacity of the accumulator 44 can be temporarily reduced to the level necessary for the dumper function, and the time for oil discharge from the clutch, of which the connection with the hydraulic path 33 is blocked by the manual valve 41, to the exhaust port Ex can be shortened. That is, in this state, the accumulator 44 can be effectively used for the dumper function for reducing the shock (D-N shock) at the time of engagement of the C1 control system 18 accompanied by the shift operation.

Thus, the single accumulator 44 can be used for both the function (accumulating/discharging function) for supplying the hydraulic pressure to the C1 control system 18 at the time of engine restart and the function (dumper function) for reducing the engagement shock of the C1 control system 18, and can be used according to purpose by connecting the accumulator 44 to the hydraulic path 33 through either the first oil path 46 or the second oil path 47. As a result, a plurality of accumulators does not need to be installed to realize the plurality of functions, and the plurality of functions can be realized with a simple configuration of only the single accumulator.

In the hydraulic pressure control device 1 of the present embodiment, the connection control means includes the switching valve 48 for switching to communicate the accumulator 44 to the hydraulic path 33 (clutch oil path 38) through the first oil path 46 when the engine 3 is stopped, and to communicate the accumulator 44 to the hydraulic path 33 (clutch oil path 38) through the second oil path 47 when the engine 3 is operating, and the accumulation control valve 43, arranged between the switching valve 48 and the accumulator 44, for controlling the accumulation and the discharging of the accumulator 44.

According to such configuration, the switching valve 48 is switched according to the operation state of the engine 3, where the accumulator 44 is communicated with the second oil path 47 by the switching valve 48 at the time of normal travelling in which the engine 3 is operated, and the accumulator 44 is communicated with the first oil path 46 by the switching valve 48 at the time of idling stop travelling in which the engine 3 is stopped.

Therefore, the single accumulator 44 can be switched to be able to perform the appropriate function of accumulation, discharge, and dumper according to the operation state of the engine 3. Furthermore, the switching valve 48 can be switched according to the presence or absence of the line pressure PL, where a control system does not need to be prepared since the electrical control is not necessary, and hence the cost can be reduced.

The hydraulic pressure control device 1 of the present embodiment includes the check valve 49 for preventing the backflow of the oil toward the upstream side of the hydraulic path 33 on the upstream side of the connecting position with the first oil path 46 on the hydraulic path 33 (clutch oil path 38). According to such configuration, the leakage and backflow toward the upstream side of the oil discharged from the accumulator 44 to the clutch oil path 38 through the first oil path 46 can be prevented and the hydraulic pressure Plpm2 can be efficiently increased by the accumulator 44 in the discharging process of the accumulator 44.

In the hydraulic pressure control device 1 of the present embodiment, the back pressure control oil path 50 is connected to the hydraulic path 33 (clutch oil path 38) at the upstream side of the check valve 49. According to such configuration, in the discharging process of the accumulator 44, the oil discharged from the accumulator 44 to the clutch oil path 38 is prevented from flowing into the back pressure control oil path 50 and being introduced to the second back pressure chamber 44e of the accumulator 44, so that the discharging capacity of the accumulator 44 can be prevented from reducing and the increase in pressure of the clutch oil path 38 can be more efficiently carried out.

The vehicle control device according to the present embodiment includes the engine 3, the C1 clutch, and the hydraulic pressure control device 1 for controlling the hydraulic pressure of the oil supplied to activate the C1 clutch, and can execute the eco-run control (idling stop control) for stopping the engine 3 during the vehicle travelling.

According to such configuration, the discharging process of the accumulator 44 of the hydraulic pressure control device 1 is performed upon returning from the eco-run control in which the engine 3 is stopped, so that the clutch pressure Pc1 to supply to the C1 control system 18 for controlling the C1 clutch can be controlled to a desired value (e.g., pack plugging pressure), and the clutch control at the time of return from the eco-run control can be smoothly carried out.

MODIFICATION

A modification of the present embodiment will now be described with reference to FIG. 9. In the embodiment described above, a case in which the belt type continuously variable transmission mechanism 11 (CVT) is applied as an example of the transmission has been described, but other transmissions such as, for example, a stepped automatic transmission (AT) can be used for the transmission.

Figure 9:
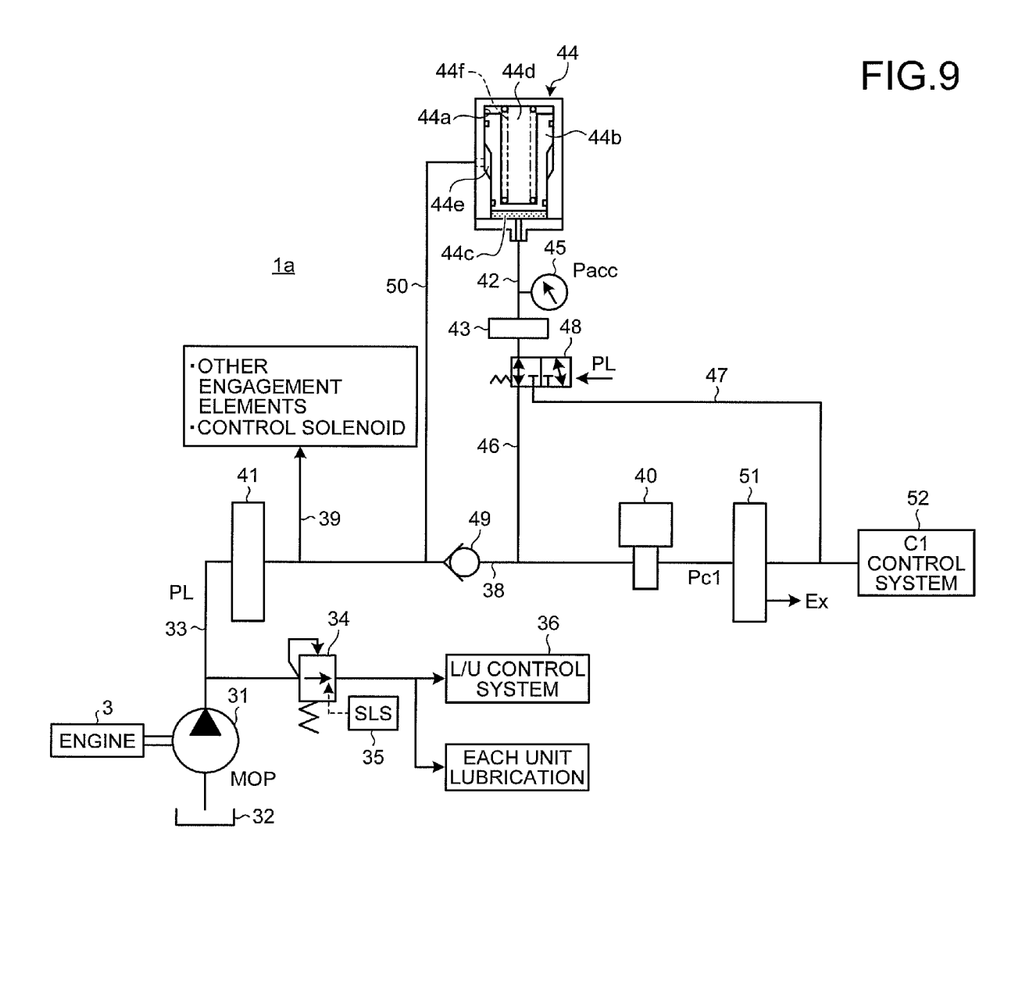
FIG. 9 is a schematic view illustrating a configuration of a hydraulic pressure control device according to a modification of one embodiment of the present invention.

For example, one example of a configuration of a hydraulic pressure control device 1a when the AT is applied as the transmission is illustrated in FIG. 9. The hydraulic pressure control device 1a of FIG. 9 differs from the hydraulic pressure control device 1 of the embodiment described above in that the manual valve 41 is arranged on the upstream side (position corresponding to LPM No. 2 valve 37 in the hydraulic pressure control device 1 of FIG. 2) of the connecting position with the hydraulic path 33 of the back pressure control oil path 50, and in that a clutch control valve 51 (selection valve) is arranged as a configuring element corresponding to the manual valve 41 in the hydraulic pressure control device 1 of FIG. 2.

The hydraulic pressure control device 1a is communicably connected to a plurality of clutches associated with the AT. In FIG. 9, the plurality of clutches is collectively illustrated as "C1 control system 52" for the sake of convenience. The clutch control valve 51 can selectively switch the clutch to communicate with the clutch oil path 38 from the plurality of clutches to realize the desired transmission gear ratio. The clutch pressure Pct is supplied to the clutch communicated with the clutch oil path 38 by the clutch control valve 51. That is, in the hydraulic pressure control device 1a, the clutch control valve 51 functions as a selection valve for selecting the clutch to supply oil from the hydraulic path 33.

In the hydraulic pressure control device 1a, the position where the second oil path 47 is connected to the hydraulic path 33 is the downstream side of the clutch control valve 51. In other words, the second oil path 47 is connected at the position of the hydraulic path 33 where the hydraulic pressure of the same level as the hydraulic pressure actually supplied to the C1 control system 52 is obtained.

The preferred embodiments have been described for the present invention, but the present invention is not limited by such embodiments. The present invention can change each component of the embodiment to the component that can be easily replaced by those skilled in the art or the component that is substantially the same.

In the embodiment described above, the combination of the switching valve 48 and the accumulation control valve 43 is illustrated as an example of the connection control means for controlling the connection between the accumulator 44 and the hydraulic path 33, but other configurations such as the configuration of arranging a control valve in each of the first oil path 46 and the second oil path 47 and opening one of the valves, for example, may be adopted.

In the embodiment described above, the switching valve 48 switches the communication of the first oil path 46 and the second oil path 47 with the line pressure PL as the activation pressure, but other than the line pressure may be used for the activation pressure as long as it can be switched according to the drive/stop of the engine 3. Similarly, in the embodiment described above, the hydraulic pressure Plpm2 of the clutch oil path 38 is used for the hydraulic pressure to be introduced to the second back pressure chamber 44e of the accumulator 44, but merely needs to be the hydraulic pressure generated according to the drive of the mechanical pump 31, and the configuration of introducing the line pressure PL, for example, may be adopted.

In the embodiment described above, the C1 clutch (forward-reverse switching clutch C1 and forward-reverse switching brake B1) of the forward-reverse switching mechanism 10 has been illustrated as the clutch having hydraulic pressure controlled by the hydraulic pressure control device 1, but a clutch other than the C1 clutch of the forward-reverse switching mechanism 10 may be used as long as the clutch can block the rotation torque between the engine and the drive wheel side in the released state at the time of idling stop control, and transmit the rotation torque from the drive wheel toward the engine in the engaged state.

REFERENCE SIGNS LIST 1, 1a hydraulic pressure control device
2 vehicle
3 engine
7 ECU
18, 52 C1 control system (clutch)
31 mechanical pump
33 hydraulic path
40 SLC linear solenoid (clutch pressure control valve)
41 manual value (selection valve)
43 accumulation control valve (connection control means)
44 accumulator
46 first oil path 47 second oil path
48 switching valve (connection control means)
49 check valve
50 back pressure control oil path (third oil path)
51 clutch control valve (selection valve)

The invention claimed is:

1. A hydraulic pressure control device comprising:
a mechanical pump configured to discharge oil by driving of an engine of a vehicle;
a hydraulic path configured to supply the oil discharged by the mechanical pump to a clutch;
a clutch pressure control valve arranged on the hydraulic path and configured to control a clutch pressure, which is a hydraulic pressure to be supplied to the clutch;
a selection valve arranged on a downstream of the clutch pressure control valve of the hydraulic path and configured to select the clutch to supply the oil from the hydraulic path;
an accumulator configured to accumulate oil supplied by the mechanical pump and discharge the accumulated oil to supply to the clutch;
a first oil path connected to the hydraulic path at an upstream side of the clutch pressure control valve;
a second oil path connected to the hydraulic path at a downstream side of the selection valve;
a connection control unit configured to control a connection between the accumulator and the hydraulic path to communicate the accumulator to either one of the first oil path and the second oil path; and
a third oil path configured to supply the oil supplied by the mechanical pump to a back pressure side of the accumulator.

2. The hydraulic pressure control device according to claim 1, wherein
the connection control unit includes
a switching valve configured to switch to communicate the accumulator to the hydraulic path through the first oil path at the time the engine is stopped and to communicate the accumulator to the hydraulic path through the second oil path at the time the engine is operating, and
an accumulation control valve arranged between the switching valve and the accumulator to control accumulation and discharging of the accumulator.

3. The hydraulic pressure control device according to claim 1, further comprising:
a check valve arranged on an upstream side than a connecting position with the first oil path on the hydraulic path and configured to prevent a backflow of oil toward the upstream side of the hydraulic path.

4. The hydraulic pressure control device according to claim 3, wherein
the third oil path is connected to the hydraulic path at the upstream side of the check valve.

5. A vehicle control device comprising:
an engine;
a clutch; and
a hydraulic pressure control device according to claim 1 configured to control a hydraulic pressure of oil supplied to activate the clutch, wherein
the vehicle control device is capable of executing an eco-run control that stops the engine during travelling of the vehicle.

6. The hydraulic pressure control device according to claim 2, further comprising:
a check valve arranged on an upstream side than a connecting position with the first oil path on the hydraulic path and configured to prevent a backflow of oil toward the upstream side of the hydraulic path.

7. A vehicle control device comprising:
an engine;
a clutch; and
a hydraulic pressure control device according to claim 2 configured to control a hydraulic pressure of oil supplied to activate the clutch, wherein
the vehicle control device is capable of executing an eco-run control that stops the engine during travelling of the vehicle.

8. A vehicle control device comprising:
an engine;
a clutch; and
a hydraulic pressure control device according to claim 3 configured to control a hydraulic pressure of oil supplied to activate the clutch, wherein
the vehicle control device is capable of executing an eco-run control that stops the engine during travelling of the vehicle.

9. A vehicle control device comprising:
an engine;
a clutch; and
a hydraulic pressure control device according to claim 4 configured to control a hydraulic pressure of oil supplied to activate the clutch, wherein
the vehicle control device is capable of executing an eco-run control that stops the engine during travelling of the vehicle.

* * * * *